April 28, 1931.  L. JAENICHEN  1,802,558
SCALE
Filed May 21, 1928  3 Sheets-Sheet 1

INVENTOR.
Louis Jaenichen
BY Francis D. Hardesty
ATTORNEY.

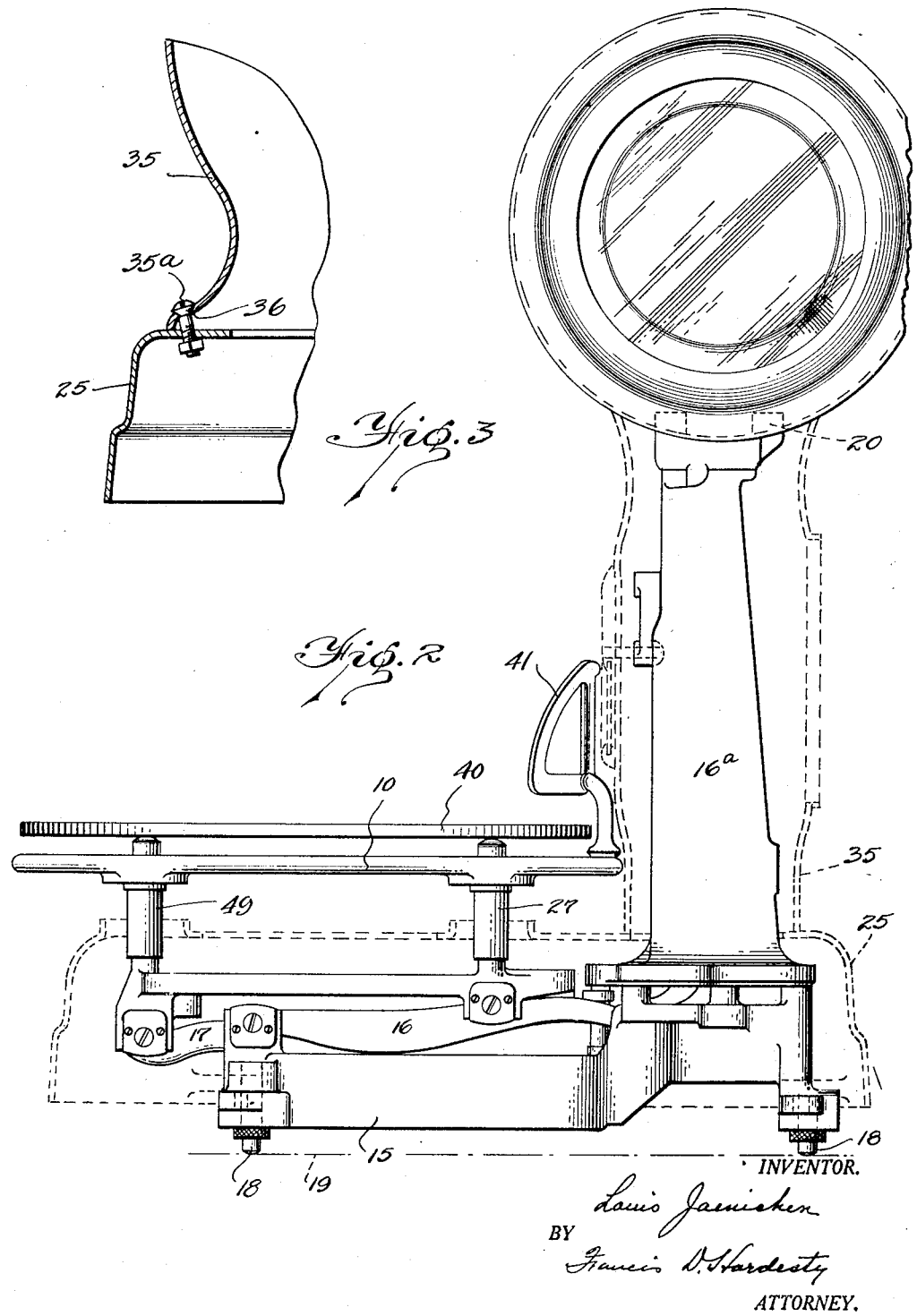

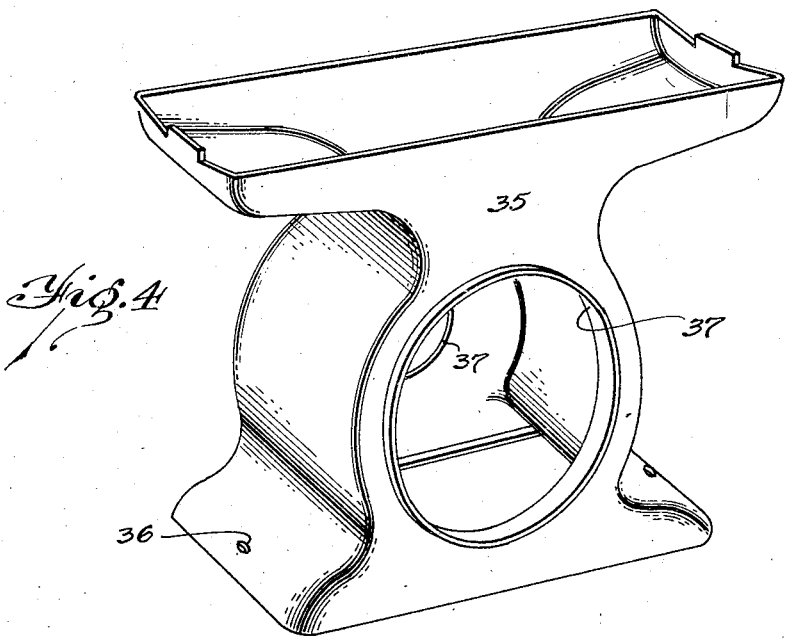
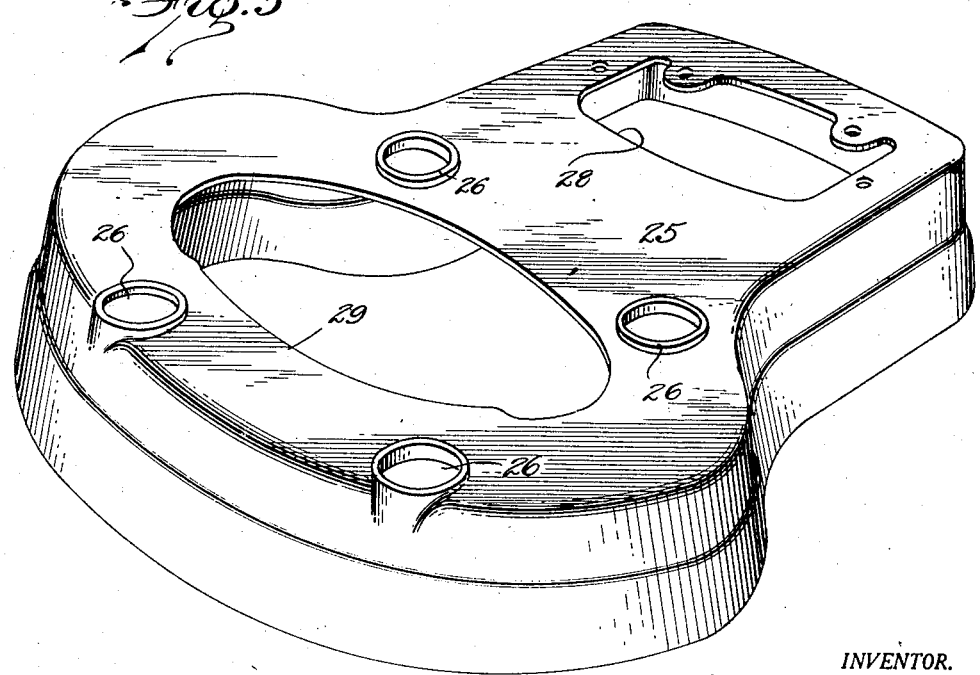

Patented Apr. 28, 1931

1,802,558

UNITED STATES PATENT OFFICE

LOUIS JAENICHEN, OF SPRINGFIELD TOWNSHIP, OAKLAND COUNTY, MICHIGAN, ASSIGNOR TO THE STANDARD COMPUTING SCALE COMPANY, OF DETROIT, MICHIGAN, A CORPORATION OF MICHIGAN

SCALE

Application filed May 21, 1928. Serial No. 279,422.

The present invention relates to weighing scales and more particularly to platform computing scales of the drum type.

Among the objects of the invention is to improve the construction of the same and at the same time, to cut down the cost of manufacture and assembling of such scales.

Another object is to increase the strength of construction of the scale, while at the same time decreasing the weight of the finished product.

Still other objects will readily occur to those skilled in the art upon reference to the following description and accompanying drawings, in which :—

Figure 2, is a side view of the same with parts in vertical section;

Figure 3, is a sectional view showing the details of construction;

Figures 4 and 5 are perspective views of the housing elements for the vertical and horizontal scale elements, respectively.

Figure 1:
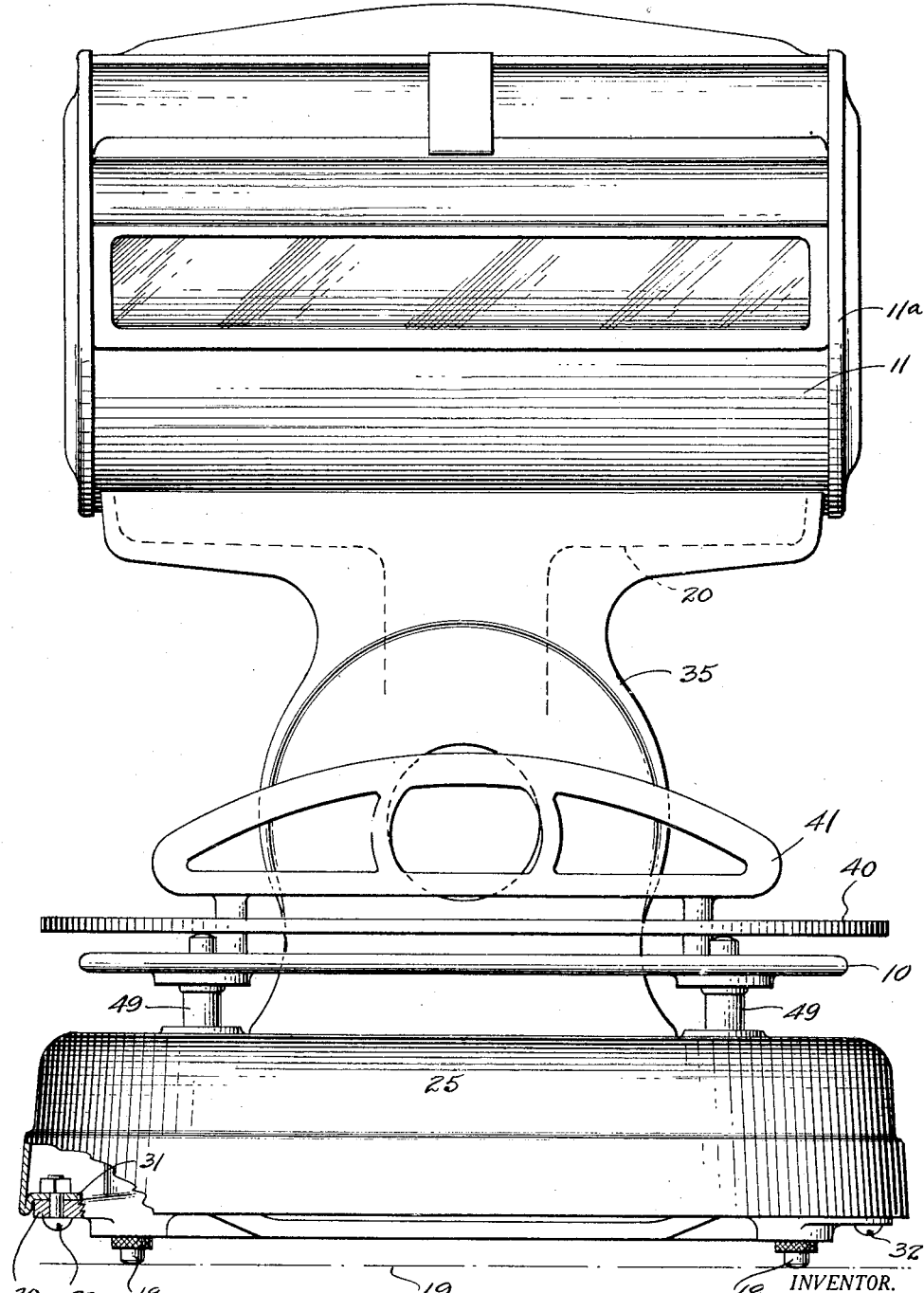
Figure 1, is a front elevation of a scale embodying the present invention.

Referring to the drawings, there is shown a scale provided with a weighing platform at 10 having a weight indicating upright carrying drum enclosed in a suitable housing at 11, which housing is mounted at one end of the platform portion, as shown best in Figure 2.

Figure 2, shows most clearly the construction of the present scale and shows a frame member 15 upon which the weighing levers 16, 17 and their bearings are mounted. This frame member 15 constitutes the real base for the scale and is provided with adjustable feet 18 to permit leveling thereof upon a suitable surface indicated by the line 19. At the rear end of the frame member 15 is an upright frame member 16a which supports the weight indicating drum and its housing 11 upon a cross member 20.

The weighing levers 16 and 17 and the parts connected thereto and with the weight indicating drum are all supported by or connected with the frame members 15 and 16 constituting a complete weighing mechanism. The parts just mentioned, however, are provided in the present scale with an enclosing housing removable as a whole from the parts functioning in the weighing operation. This housing is shown in Figures 4 and 5. The part shown in Figure 5 is adapted to substantially completely enclose the weighing levers while the part shown in Figure 4 encloses the upright portion of the mechanism between the weight indicating drum housing 11 and the weighing levers.

Referring to Figure 5, there is shown a drawn sheet metal cover piece or housing at 25 provided with openings 26 for the lugs 27 of the weighing platform and provided with an opening 28 for the passage therethrough of the upright frame member 16a and weighing elements associated therewith. The opening 28 is of such size that the member 25 may be placed on the scale over the weighing levers and base member 15 after the latter has been assembled and adjusted.

In the assembly and adjustment of the scale, of course, the weighing platform 10 will be used and will be removed before placing on the cover member 25. In order to lighten the cover member 25 and provide for observation of the scale levers, a second opening 29 may be provided under the platform.

In mounting the cover member 25 on the base member, suitable ears 30 will be provided on the base member 15 and corresponding ears 31 on the cover member 25 which ears may be secured together by means of the bolts 32 and several of such fastening devices will, of course, be used.

After the cover member 25 has been thus placed over the weighing levers and secured in place, a second cover member 35 shown in Figure 4 will be set over the upright frame member 16 and secured to the member 25 by means of screws or bolts passing through the holes 35a and into the member 25. This member 35 may be provided with openings 37 in its front and rear to afford a view of the mechanism therein and such openings may be provided with suitable glass covers.

After the member 35 has been put in place, the drum housing 11 will be secured to the cross member 20 by suitable screws or bolts and the end portions 11a of such housing put in place to provide a finished appearance.

In Figure 1, the weighing platform 10 is shown as surmounted by a glass plate 40 and to be provided with a guard member 41 to prevent the contact of articles being weighed with the upright portion of the scale.

Now having described the invention and the preferred form of embodiment thereof it is to be understood that the said invention is to be limited, not to the specific details herein set forth but only by the scope of the claims which follow.

I claim:—

1. In a platform scale including a vertical frame member, a horizontal frame member, and horizontal weighing levers, all of which are secured to one another to form an assembled unit whose component parts are not to be disturbed when once correlated, a sheet metal dish-like horizontally disposed cover disposed over said horizontal parts and bolted to said horizontal frame, and having an opening through which said vertical member extends, and a weighing platform having depending vertical legs resting on said horizontal levers and extending through openings in said cover, the latter being entirely independent of all the aforementioned parts except insofar as its bolted connections to the frame is concerned.

2. In a platform scale including a vertical frame member, a horizontal frame member, and horizontal weighing levers, all of which are secured to one another to form an assembled unit whose component parts are not to be disturbed when once correlated, a sheet metal dish-like horizontally disposed cover disposed over said horizontal parts and bolted to said horizontal frame, and having an opening through which said vertical member extends, and a sheet metal vertical frame member enclosing portion secured to said horizontally disposed cover and independent of the latter as well as of the vertical frame members which it encloses.

3. In a platform scale, a frame including a horizontal portion and a vertical portion substantially integral therewith, weighing levers disposed on the horizontal portion of said frame so as to form therewith a weighing unit whose component parts are not to be disturbed when once assembled, a sheet metal dish like horizontally disposed cover disposed over said levers and said horizontal portion and bolted to the latter, a horizontally disposed weighing platform having depending vertical legs resting on said levers, said cover member being provided with openings through which extend said vertical legs and said vertical frame portion, an independent sheet metal vertically disposed cover member secured to said horizontally disposed cover member and enclosing the vertical frame portion.

LOUIS JAENICHEN.